United States Patent
Lee et al.

(10) Patent No.: US 10,966,114 B2
(45) Date of Patent: Mar. 30, 2021

(54) METHOD AND APPARATUS FOR TRAFFIC STEERING BETWEEN NETWORKS

(71) Applicant: LG ELECTRONICS INC., Seoul (KR)

(72) Inventors: Jaewook Lee, Seoul (KR); Youngdae Lee, Seoul (KR); Sunghoon Jung, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 16/812,898

(22) Filed: Mar. 9, 2020

(65) Prior Publication Data

US 2020/0213892 A1    Jul. 2, 2020

Related U.S. Application Data

(63) Continuation of application No. 16/390,974, filed on Apr. 22, 2019, now Pat. No. 10,623,979, which is a
(Continued)

(51) Int. Cl.
*H04W 28/02* (2009.01)
*H04L 5/00* (2006.01)
(Continued)

(52) U.S. Cl.
CPC ....... *H04W 28/0231* (2013.01); *H04L 5/0053* (2013.01); *H04L 5/0098* (2013.01);
(Continued)

(58) Field of Classification Search
CPC ... H04W 28/0231; H04W 4/06; H04W 48/14; H04W 28/0247; H04W 28/02;
(Continued)

(56) References Cited

U.S. PATENT DOCUMENTS 10,313,915 B2   6/2019 Lee et al.
10,623,979 B2 * 4/2020 Lee .................. H04W 28/02
(Continued)

FOREIGN PATENT DOCUMENTS

CN   101079769 A   11/2007
CN   103220786 A   7/2013
(Continued)

OTHER PUBLICATIONS

3GPP TS 25.331, Radio Resource Control (RRC); Protocol specification (Release 11) [online], Sep. 2012 [retrieved on Jun. 14, 2018]. V11.3.0 Retrieved from the Internet: <URL: http://jm.telecoms.free.fr/QCM_UMTS/25331-b30_RRC_release11.pdf>. (Year: 2012).
Access Network Selection, U.S. Appl. No. 61/875,934, filed Sep. 10, 2013, pp. 1-37. (Year: 2013).
Alcatel-Lucent et al., "Introduction of traffic steering for RAN-based WLAN interworking solution", S2-141917, 3GPP TSG SA WG2 Meeting #103, Phoenix, Arizona, USA, May 2014, (www.3gpp.org/ftp/tsg_sa/WG2_Arch/TSGS2_103_Phoenix/Docs/).
(Continued)

*Primary Examiner* — Omar J Ghowrwal
(74) *Attorney, Agent, or Firm* — Birch, Stewart, Kolasch & Birch, LLP

(57) ABSTRACT

A method performed by a user equipment (UE) in a wireless communication system includes receiving radio access network (RAN) assistance information from a first network system; evaluating conditions for a traffic steering between the first network system and a second network system by comparing the RAN assistance information only with a quality of a primary cell (PCell) among serving cells of the first network system; and performing the traffic steering from the first network system to the second network system based on that the conditions for the traffic steering are met on the PCell.

13 Claims, 11 Drawing Sheets

Related U.S. Application Data continuation of application No. 15/311,465, filed as application No. PCT/KR2015/004944 on May 18, 2015, now Pat. No. 10,313,915.

(60) Provisional application No. 61/994,136, filed on May 16, 2014.

(51) Int. Cl.
| | | |
|---|---|---|
| *H04W 4/06* | (2009.01) | |
| *H04W 48/14* | (2009.01) | |
| *H04W 84/12* | (2009.01) | |

(52) U.S. Cl.
CPC ............. *H04W 4/06* (2013.01); *H04W 28/02* (2013.01); *H04W 28/0247* (2013.01); *H04W 48/14* (2013.01); *H04L 5/0007* (2013.01); *H04W 84/12* (2013.01)

(58) Field of Classification Search
CPC .... H04W 84/12; H04L 5/0053; H04L 5/0098; H04L 5/0007
See application file for complete search history.

(56) References Cited

U.S. PATENT DOCUMENTS

| | | |
|---|---|---|
| 2014/0307623 A1 | 10/2014 | Gheorghiu et al. |
| 2015/0271729 A1 | 9/2015 | Sirotkin et al. |
| 2016/0037401 A1 | 2/2016 | Lee et al. |
| 2016/0219477 A1 | 7/2016 | Bergstrom et al. |
| 2016/0295614 A1 | 10/2016 | Lee et al. |
| 2016/0353361 A1 | 12/2016 | Jung et al. |
| 2017/0013674 A1 | 1/2017 | Soldati |

FOREIGN PATENT DOCUMENTS

| | | |
|---|---|---|
| CN | 103391632 A | 11/2013 |
| CN | 103428736 A | 12/2013 |
| WO | WO 2012/167184 A2 | 12/2012 |

OTHER PUBLICATIONS

Broadcom Corporation, "RAN Assistance Parameters for WLAN/3GPP Radio Interworking", R2-140401, 3GPP TSG RAN WG2 Meeting #85, Prague, Czech Republic, Feb. 2014, (www.3gpp.org/ftp/tsg_ran/WG2_RL2/TSGR2_85/Docs/).

Broadcom Corporation, "TP for 36.300, 25.300," 3GPP TSG-RAN WG2 Meeting #85bis, R2-141217, Valencia, Spain, Mar. 31-Apr. 4, 2014 (EPO Server date Mar. 22, 2014), 4 pages, XP050817779.

Catt, "RAN Assistance Information and Transmission Mechanism", R2-140079, 3GPP TSG RAN WG2 Meeting #85, Prague, Czech Republic, Feb. 2014, (www.3gpp.org/ftp/tsg_ran/WG2_RL2/TSGR2_85/Docs/).

Ericsson et al., "Traffic steering for RAN-based WLAN interworking solution", S2-141652, 3GPP TSG SA WG2 Meeting #103, Phoenix, Arizona, USA, May 2014, (www.3gpp.org/ftp/tsg_sa/WG2_Arch/TSGS2_103_Phoenix/Docs/).

Huawei et al., "Definition of RAN Rules and ANDSF Rules and their Interworking," 3GPP TSG-RAN WG2 Meeting #85bis, R2-141654, Valencia, Spain, Mar. 31-Apr. 4, 2014 (EPO Server date Mar. 22, 2014), pp. 1/3 to 4/3, XP050792794.

KDDI Corporation et al., "RAN assistance parameters for access network selection/traffic steering", R2-140415, 3GPP TSG RAN WG2 Meeting #85, Prague, Czech Republic, Feb. 2014, (www.3gpp.org/ftp/tsg_ran/WG2_RL2/TSGR2_85/Docs/).

LG Electronics Inc., "Open Issues Regarding Interworking Policy Evaluation," 3GPP TSG-RAN2 Meeting #86, R2-142597, Seoul, Republic of Korea, May 19-23, 2014 (May 10, 2014), pp. 1-3.

Nsn et al., "Special Cell in SeNB," 3GPP TSG-RAN WG2 Meeting #85, R2-140372, Prague, Czech Republic, Feb. 10-14, 2014, 6 pages.

NTT DOCOMO, Inc. et al., "UL DRB Handling for Dual Connectivity," 3GPP TSG-RAN WG2 #85, R2-140190, Prague, Czech Republic, Feb. 10-14, 2014, pp. 1-4.

Stage-2 and Stage-3 Details of UMTS/WLAN Radio Internetworking, U.S. Appl. No. 61/969,790, filed Mar. 24, 2014, pp. 1-20. (Year: 2014).

\* cited by examiner

METHOD AND APPARATUS FOR TRAFFIC STEERING BETWEEN NETWORKS

CROSS-REFERENCE TO RELATED APPLICATIONS

This application is a Continuation of U.S. patent application Ser. No. 16/390,974 filed on Apr. 22, 2019, which is a Continuation of U.S. patent application Ser. No. 15/311, 465 filed on Nov. 15, 2016 (now U.S. Pat. No. 10,313,915 issued on Jun. 4, 2019), which is the National Phase of PCT International Application No. PCT/KR2015/004944 filed on May 18, 2015, which claims the priority benefit under 35 U.S.C. § 119(e) to U.S. Provisional Application No. 61/994, 136 filed on May 16, 2014, all of which are hereby expressly incorporated by reference into the present application.

BACKGROUND OF THE INVENTION

Field of the Invention

The present invention relates to wireless communications, and more particularly, to a method and apparatus for performing traffic steering for carrier aggregation (CA) and dual connectivity (DC) in a wireless communication system.

Discussion of the Related Art

3rd generation partnership project (3GPP) long-term evolution (LTE) is a technology for enabling high-speed packet communications. Many schemes have been proposed for the LTE objective including those that aim to reduce user and provider costs, improve service quality, and expand and improve coverage and system capacity. The 3GPP LTE requires reduced cost per bit, increased service availability, flexible use of a frequency band, a simple structure, an open interface, and adequate power consumption of a terminal as an upper-level requirement.

The 3GPP LTE may configure carrier aggregation (CA). In CA, two or more component carriers (CCs) are aggregated in order to support wider transmission bandwidths up to 100 MHz. A user equipment (UE) may simultaneously receive or transmit on one or multiple CCs depending on its capabilities. In CA, one primary cell (PCell) and at least one secondary cell (SCell) may be configured.

Small cells using low power nodes are considered promising to cope with mobile traffic explosion, especially for hotspot deployments in indoor and outdoor scenarios. A low-power node generally means a node whose transmission power is lower than macro node and base station (BS) classes, for example pico and femto evolved NodeB (eNB) are both applicable. Small cell enhancements for evolved UMTS terrestrial radio access (E-UTRA) and evolved UMTS terrestrial radio access network (E-UTRAN) will focus on additional functionalities for enhanced performance in hotspot areas for indoor and outdoor using low power nodes.

One of potential solutions for small cell enhancement, dual connectivity (DC) has been discussed. Dual connectivity is used to refer to operation where a given UE consumes radio resources provided by at least two different network points connected with non-ideal backhaul. Furthermore, each eNB involved in dual connectivity for a UE may assume different roles. Those roles do not necessarily depend on the eNB's power class and can vary among UEs.

3GPP/wireless local area network (WLAN) interworking has been discussed. 3GPP/WLAN interworking may be called traffic steering. From rel-8 of 3GPP LTE, access network discovery and selection functions (ANDSF) for detecting and selecting accessible access networks have been standardized while interworking with non-3GPP access (e.g., WLAN) is introduced. The ANDSF may carry detection information of access networks accessible in location of a user equipment (UE) (e.g., WLAN, WiMAX location information, etc.), inter-system mobility policies (ISMP) which is able to reflect operator's policies, and inter-system routing policy (ISRP). Based on the information described above, the UE may determine which Internet protocol (IP) traffic is transmitted through which access network. The ISMP may include network selection rules for the UE to select one active access network connection (e.g., WLAN or 3GPP). The ISRP may include network selection rules for the UE to select one or more potential active access network connection (e.g., both WLAN and 3GPP). The ISRP may include multiple access connectivity (MAPCON), IP flow mobility (IFOM) and non-seamless WLAN offloading. Open mobile alliance (OMA) device management (DM) may be used for dynamic provision between the ANDSF and the UE.

UE operation related to traffic steering between 3GPP/ WLAN needs to be defined clearly, when a plurality of serving cells is configured by CA or DC.

SUMMARY OF THE INVENTION

The present invention provides a method and apparatus for performing traffic steering for carrier aggregation (CA) and dual connectivity (DC). The present invention provides a method and apparatus for performing traffic steering between a serving cell and a wireless local area network (WLAN), when a plurality of serving cells is configured by CA or DC. The present invention provides a method and apparatus for evaluating conditions for traffic steering on a specific serving cell, when a plurality of serving cells is configured by CA or DC.

In an aspect, a method for evaluating, by a user equipment (UE), conditions for traffic steering in a wireless communication system is provided. The method includes receiving radio access network (RAN) assistance information on a primary cell (PCell), and evaluating conditions for traffic steering only on the PCell based on the received RAN assistance information.

The UE may be configured with the PCell and at least one secondary cell (SCell) by carrier aggregation.

The UE may be configured with the PCell of a master evolved NodeB (MeNB) and a primary SCell (PSCell) of a secondary eNB (SeNB) by dual connectivity.

The RAN assistance information may be received via broadcast signaling or dedicated signaling.

The method may further include, when the conditions for traffic steering are met on the PCell, performing traffic steering between a serving cell and a wireless local area network (WLAN). The serving cell may be the PCell. The serving cell may be the other serving cell than the PCell.

In another aspect, a method for performing, by a user equipment (UE), traffic steering in a wireless communication system is provided. The method includes receiving radio access network (RAN) assistance information for each of a plurality of serving cells, and performing traffic steering between one serving cell, among the plurality of serving cells, and a wireless local area network (WLAN).

User equipment (UE) operation related to traffic steering can be clear when a plurality of serving cells is configured by CA or DC.

DETAILED DESCRIPTION OF THE EMBODIMENTS

The technology described below can be used in various wireless communication systems such as code division multiple access (CDMA), frequency division multiple access (FDMA), time division multiple access (TDMA), orthogonal frequency division multiple access (OFDMA), single carrier frequency division multiple access (SC-FDMA), etc. The CDMA can be implemented with a radio technology such as universal terrestrial radio access (UTRA) or CDMA-2000. The TDMA can be implemented with a radio technology such as global system for mobile communications (GSM)/general packet ratio service (GPRS)/enhanced data rate for GSM evolution (EDGE). The OFDMA can be implemented with a radio technology such as institute of electrical and electronics engineers (IEEE) 802.11 (WI-FI), IEEE 802.16 (WIMAX), IEEE 802-20, evolved UTRA (E-UTRA), etc. IEEE 802.16m is an evolution of IEEE 802.16e, and provides backward compatibility with an IEEE 802.16-based system. The UTRA is a part of a universal mobile telecommunication system (UMTS). 3rd generation partnership project (3GPP) long term evolution (LTE) is a part of an evolved UMTS (E-UMTS) using the E-UTRA. The 3GPP LTE uses the OFDMA in downlink and uses the SC-FDMA in uplink. LTE-advance (LTE-A) is an evolution of the 3GPP LTE.

For clarity, the following description will focus on the LTE-A. However, technical features of the present invention are not limited thereto.

Figure 1:
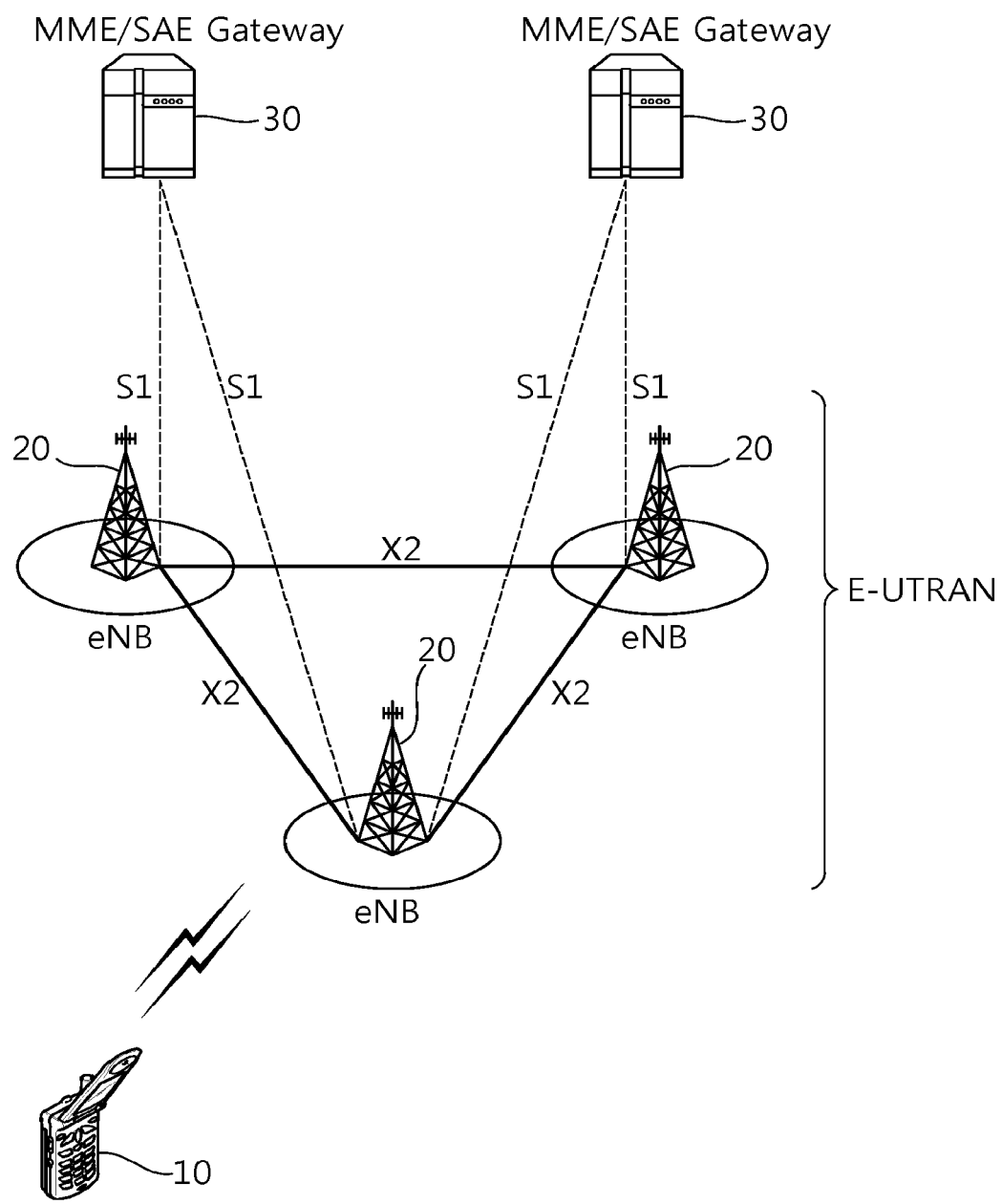
FIG. 1 shows LTE system architecture.

FIG. 1 shows LTE system architecture. The communication network is widely deployed to provide a variety of communication services such as voice over internet protocol (VoIP) through IMS and packet data.

Referring to FIG. 1, the LTE system architecture includes one or more user equipment (UE; 10), an evolved-UMTS terrestrial radio access network (E-UTRAN) and an evolved packet core (EPC). The UE 10 refers to a communication equipment carried by a user. The UE 10 may be fixed or mobile, and may be referred to as another terminology, such as a mobile station (MS), a user terminal (UT), a subscriber station (SS), a wireless device, etc.

The E-UTRAN includes one or more evolved node-B (eNB) 20, and a plurality of UEs may be located in one cell. The eNB 20 provides an end point of a control plane and a user plane to the UE 10. The eNB 20 is generally a fixed station that communicates with the UE 10 and may be referred to as another terminology, such as a base station (BS), an access point, etc. One eNB 20 may be deployed per cell.

Hereinafter, a downlink (DL) denotes communication from the eNB 20 to the UE 10, and an uplink (UL) denotes communication from the UE 10 to the eNB 20. In the DL, a transmitter may be a part of the eNB 20, and a receiver may be a part of the UE 10. In the UL, the transmitter may be a part of the UE 10, and the receiver may be a part of the eNB 20.

The EPC includes a mobility management entity (MME) and a system architecture evolution (SAE) gateway (S-GW). The MME/S-GW 30 may be positioned at the end of the network and connected to an external network. For clarity, MME/S-GW 30 will be referred to herein simply as a "gateway," but it is understood that this entity includes both the MME and S-GW.

The MME provides various functions including non-access stratum (NAS) signaling to eNBs 20, NAS signaling security, access stratum (AS) security control, inter core network (CN) node signaling for mobility between 3GPP access networks, idle mode UE reachability (including control and execution of paging retransmission), tracking area list management (for UE in idle and active mode), packet data network (PDN) gateway (P-GW) and S-GW selection, MME selection for handovers with MME change, serving GPRS support node (SGSN) selection for handovers to 2G or 3G 3GPP access networks, roaming, authentication, bearer management functions including dedicated bearer establishment, support for public warning system (PWS) (which includes earthquake and tsunami warning system (ETWS) and commercial mobile alert system (CMAS)) message transmission. The S-GW host provides assorted functions including per-user based packet filtering (by e.g., deep packet inspection), lawful interception, UE Internet protocol (IP) address allocation, transport level packet marking in the DL, UL and DL service level charging, gating and rate enforcement, DL rate enforcement based on access point name aggregate maximum bit rate (APN-AMBR).

Interfaces for transmitting user traffic or control traffic may be used. The UE 10 is connected to the eNB 20 via a Uu interface. The eNBs 20 are connected to each other via an X2 interface. Neighboring eNBs may have a meshed network structure that has the X2 interface. A plurality of nodes may be connected between the eNB 20 and the gateway 30 via an S1 interface.

Figure 2:
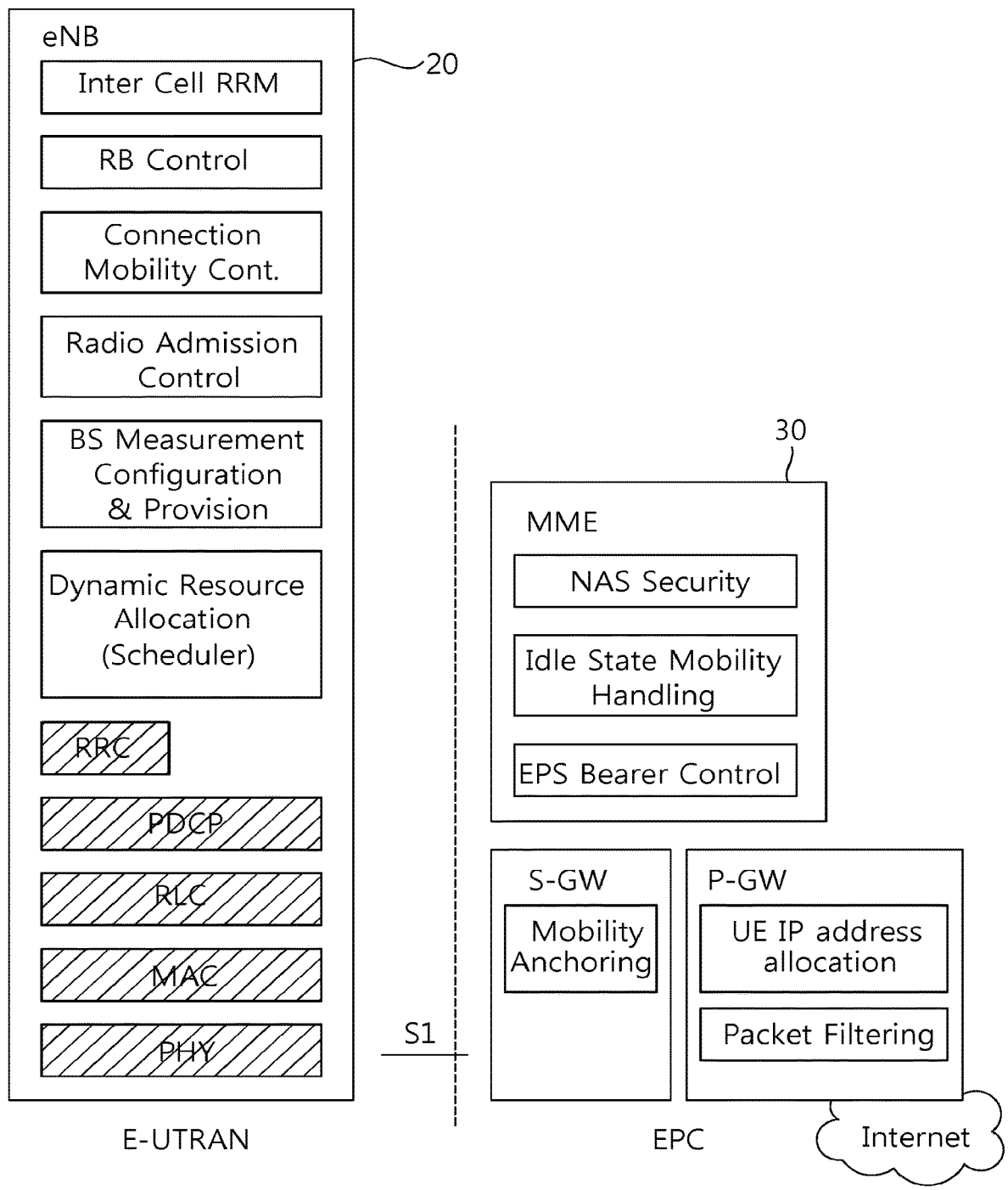
FIG. 2 shows a block diagram of architecture of a typical E-UTRAN and a typical EPC.

FIG. 2 shows a block diagram of architecture of a typical E-UTRAN and a typical EPC. Referring to FIG. 2, the eNB 20 may perform functions of selection for gateway 30, routing toward the gateway 30 during a radio resource control (RRC) activation, scheduling and transmitting of paging messages, scheduling and transmitting of broadcast channel (BCH) information, dynamic allocation of resources to the UEs 10 in both UL and DL, configuration and provisioning of eNB measurements, radio bearer control, radio admission control (RAC), and connection mobility control in LTE_ACTIVE state. In the EPC, and as noted above, gateway 30 may perform functions of paging origination, LTE_IDLE state management, ciphering of the user plane, SAE bearer control, and ciphering and integrity protection of NAS signaling.

Figure 3:
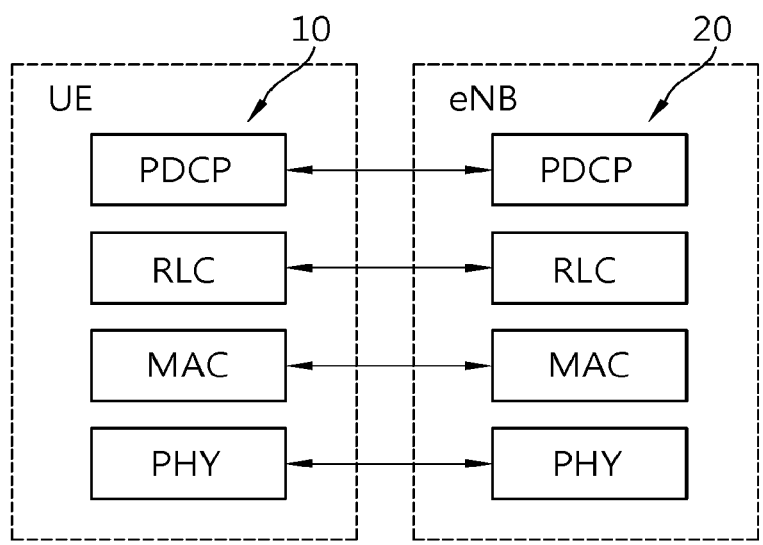
FIG. 3 shows a block diagram of a user plane protocol stack of an LTE system.
Figure 4:
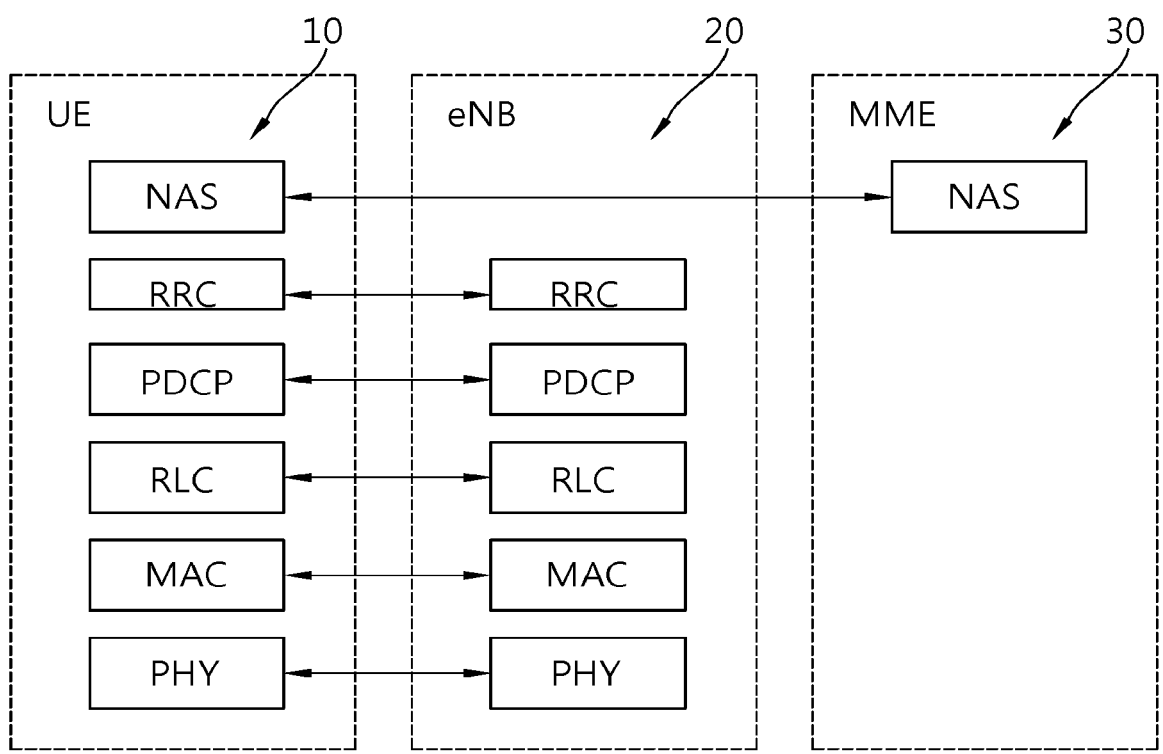
FIG. 4 shows a block diagram of a control plane protocol stack of an LTE system.

FIG. 3 shows a block diagram of a user plane protocol stack of an LTE system. FIG. 4 shows a block diagram of a control plane protocol stack of an LTE system. Layers of a radio interface protocol between the UE and the E-UTRAN may be classified into a first layer (L1), a second layer (L2), and a third layer (L3) based on the lower three layers of the open system interconnection (OSI) model that is well-known in the communication system.

A physical (PHY) layer belongs to the L. The PHY layer provides a higher layer with an information transfer service through a physical channel. The PHY layer is connected to a medium access control (MAC) layer, which is a higher layer of the PHY layer, through a transport channel. A physical channel is mapped to the transport channel. Data between the MAC layer and the PHY layer is transferred through the transport channel. Between different PHY layers, i.e., between a PHY layer of a transmission side and a PHY layer of a reception side, data is transferred via the physical channel.

A MAC layer, a radio link control (RLC) layer, and a packet data convergence protocol (PDCP) layer belong to the L2. The MAC layer provides services to the RLC layer, which is a higher layer of the MAC layer, via a logical channel. The MAC layer provides data transfer services on logical channels. The RLC layer supports the transmission of data with reliability. Meanwhile, a function of the RLC layer may be implemented with a functional block inside the MAC layer. In this case, the RLC layer may not exist. The PDCP layer provides a function of header compression function that reduces unnecessary control information such that data being transmitted by employing IP packets, such as IPv4 or Ipv6, can be efficiently transmitted over a radio interface that has a relatively small bandwidth.

A radio resource control (RRC) layer belongs to the L3. The RLC layer is located at the lowest portion of the L3, and is only defined in the control plane. The RRC layer controls logical channels, transport channels, and physical channels in relation to the configuration, reconfiguration, and release of radio bearers (RBs). The RB signifies a service provided the L2 for data transmission between the UE and E-UTRAN.

Referring to FIG. 3, the RLC and MAC layers (terminated in the eNB on the network side) may perform functions such as scheduling, automatic repeat request (ARQ), and hybrid ARQ (HARQ). The PDCP layer (terminated in the eNB on the network side) may perform the user plane functions such as header compression, integrity protection, and ciphering.

Referring to FIG. 4, the RLC and MAC layers (terminated in the eNB on the network side) may perform the same functions for the control plane. The RRC layer (terminated in the eNB on the network side) may perform functions such as broadcasting, paging, RRC connection management, RB control, mobility functions, and UE measurement reporting and controlling. The NAS control protocol (terminated in the MME of gateway on the network side) may perform functions such as a SAE bearer management, authentication, LTE_IDLE mobility handling, paging origination in LTE_IDLE, and security control for the signaling between the gateway and UE.

Figure 5:
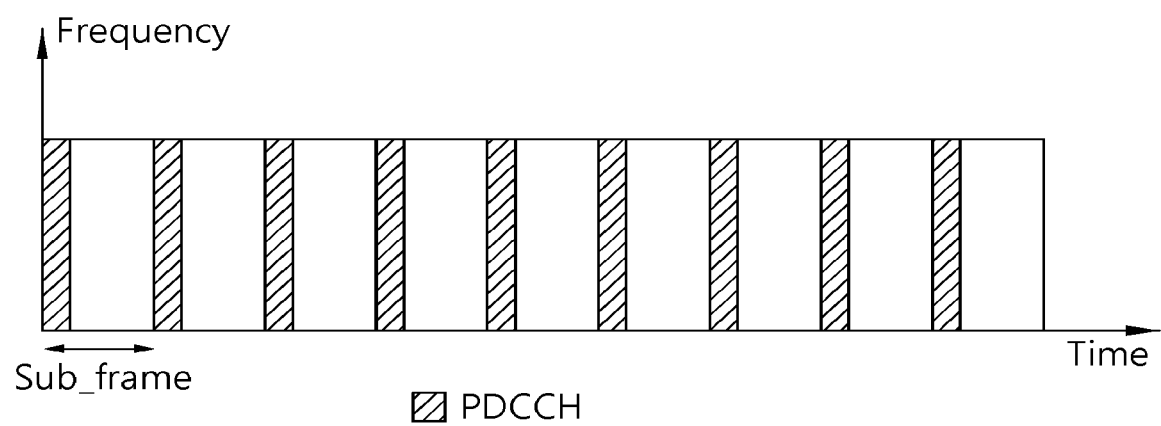
FIG. 5 shows an example of a physical channel structure.

FIG. 5 shows an example of a physical channel structure. A physical channel transfers signaling and data between PHY layer of the UE and eNB with a radio resource. A physical channel consists of a plurality of subframes in time domain and a plurality of subcarriers in frequency domain. One subframe, which is 1 ms, consists of a plurality of symbols in the time domain. Specific symbol(s) of the subframe, such as the first symbol of the subframe, may be used for a physical downlink control channel (PDCCH). The PDCCH carries dynamic allocated resources, such as a physical resource block (PRB) and modulation and coding scheme (MCS).

A DL transport channel includes a broadcast channel (BCH) used for transmitting system information, a paging channel (PCH) used for paging a UE, a downlink shared channel (DL-SCH) used for transmitting user traffic or control signals, a multicast channel (MCH) used for multicast or broadcast service transmission. The DL-SCH supports HARQ, dynamic link adaptation by varying the modulation, coding and transmit power, and both dynamic and semi-static resource allocation. The DL-SCH also may enable broadcast in the entire cell and the use of beamforming.

A UL transport channel includes a random access channel (RACH) normally used for initial access to a cell, a uplink shared channel (UL-SCH) for transmitting user traffic or control signals, etc. The UL-SCH supports HARQ and dynamic link adaptation by varying the transmit power and potentially modulation and coding. The UL-SCH also may enable the use of beamforming.

The logical channels are classified into control channels for transferring control plane information and traffic channels for transferring user plane information, according to a type of transmitted information. That is, a set of logical channel types is defined for different data transfer services offered by the MAC layer.

The control channels are used for transfer of control plane information only. The control channels provided by the MAC layer include a broadcast control channel (BCCH), a paging control channel (PCCH), a common control channel (CCCH), a multicast control channel (MCCH) and a dedicated control channel (DCCH). The BCCH is a downlink channel for broadcasting system control information. The PCCH is a downlink channel that transfers paging information and is used when the network does not know the location cell of a UE. The CCCH is used by UEs having no RRC connection with the network. The MCCH is a point-to-multipoint downlink channel used for transmitting multimedia broadcast multicast services (MBMS) control information from the network to a UE. The DCCH is a point-to-point bi-directional channel used by UEs having an RRC connection that transmits dedicated control information between a UE and the network.

Traffic channels are used for the transfer of user plane information only. The traffic channels provided by the MAC layer include a dedicated traffic channel (DTCH) and a multicast traffic channel (MTCH). The DTCH is a point-to-point channel, dedicated to one UE for the transfer of user information and can exist in both uplink and downlink. The MTCH is a point-to-multipoint downlink channel for transmitting traffic data from the network to the UE.

Uplink connections between logical channels and transport channels include the DCCH that can be mapped to the UL-SCH, the DTCH that can be mapped to the UL-SCH and the CCCH that can be mapped to the UL-SCH. Downlink connections between logical channels and transport channels include the BCCH that can be mapped to the BCH or DL-SCH, the PCCH that can be mapped to the PCH, the DCCH that can be mapped to the DL-SCH, and the DTCH that can be mapped to the DL-SCH, the MCCH that can be mapped to the MCH, and the MTCH that can be mapped to the MCH.

An RRC state indicates whether an RRC layer of the UE is logically connected to an RRC layer of the E-UTRAN. The RRC state may be divided into two different states such as an RRC idle state (RRC_IDLE) and an RRC connected state (RRC_CONNECTED). In RRC_IDLE, the UE may receive broadcasts of system information and paging information while the UE specifies a discontinuous reception (DRX) configured by NAS, and the UE has been allocated an identification (ID) which uniquely identifies the UE in a tracking area and may perform public land mobile network (PLMN) selection and cell re-selection. Also, in RRC_IDLE, no RRC context is stored in the eNB.

In RRC_CONNECTED, the UE has an E-UTRAN RRC connection and a context in the E-UTRAN, such that transmitting and/or receiving data to/from the eNB becomes possible. Also, the UE can report channel quality information and feedback information to the eNB. In RRC_CONNECTED, the E-UTRAN knows the cell to which the UE belongs. Therefore, the network can transmit and/or receive data to/from UE, the network can control mobility (handover and inter-radio access technologies (RAT) cell change order to GSM EDGE radio access network (GERAN) with network assisted cell change (NACC)) of the UE, and the network can perform cell measurements for a neighboring cell.

In RRC_IDLE, the UE specifies the paging DRX cycle. Specifically, the UE monitors a paging signal at a specific paging occasion of every UE specific paging DRX cycle. The paging occasion is a time interval during which a paging signal is transmitted. The UE has its own paging occasion. A paging message is transmitted over all cells belonging to the same tracking area. If the UE moves from one tracking area (TA) to another TA, the UE will send a tracking area update (TAU) message to the network to update its location.

Carrier aggregation (CA) is described. It may be referred to Section 5.5 and 7.5 of 3GPP TS 36.300 V12.1.0 (2014-03). A UE with single timing advance (TA) capability for CA can simultaneously receive and/or transmit on multiple CCs corresponding to multiple serving cells sharing the same TA (multiple serving cells grouped in one timing advance group (TAG)). A UE with multiple TA capability for CA can simultaneously receive and/or transmit on multiple CCs corresponding to multiple serving cells with different TAs (multiple serving cells grouped in multiple TAGs). E-UTRAN ensures that each TAG contains at least one serving cell. A non-CA capable UE can receive on a single CC and transmit on a single CC corresponding to one serving cell only (one serving cell in one TAG). The CA is supported for both contiguous and non-contiguous CCs with each CC limited to a maximum of 110 resource blocks in the frequency domain.

It is possible to configure a UE to aggregate a different number of CCs originating from the same eNB and of possibly different bandwidths in the UL and the DL. The number of DL CCs that can be configured depends on the DL aggregation capability of the UE. The number of UL CCs that can be configured depends on the UL aggregation capability of the UE. It is not possible to configure a UE with more UL CCs than DL CCs. In typical time division duplex (TDD) deployments, the number of CCs and the bandwidth of each CC in UL and DL is the same. The number of TAGs that can be configured depends on the TAG capability of the UE. CCs originating from the same eNB need not to provide the same coverage.

When CA is configured, the UE only has one RRC connection with the network. At RRC connection establishment/re-establishment/handover, one serving cell provides the NAS mobility information (e.g. tracking area identity (TAI)), and at RRC connection re-establishment/handover, one serving cell provides the security input. This cell is referred to as the primary cell (PCell). In the DL, the carrier corresponding to the PCell is the DL primary CC (DL PCC), while in the UL, it is the UL primary CC (UL PCC).

Depending on UE capabilities, secondary cells (SCells) can be configured to form, together with the PCell, a set of serving cells. In the DL, the carrier corresponding to a SCell is a DL secondary CC (DL SCC), while in the UL, it is an UL secondary CC (UL SCC).

The configured set of serving cells for a UE always consists of one PCell and one or more SCells. For each SCell, the usage of UL resources by the UE in addition to the DL resources is configurable (the number of DL SCCs configured is therefore always larger than or equal to the number of UL SCCs and no SCell can be configured for usage of UL resources only). From a UE viewpoint, each UL resource only belongs to one serving cell. The number of serving cells that can be configured depends on the aggregation capability of the UE. PCell can only be changed with handover procedure (i.e. with security key change and RACH procedure). PCell is used for transmission of PUCCH. Unlike SCells, PCell cannot be de-activated. Re-establishment is triggered when PCell experiences radio link failure (RLF), not when SCells experience RLF. NAS information is taken from PCell.

The reconfiguration, addition and removal of SCells can be performed by RRC. At intra-LTE handover, RRC can also add, remove, or reconfigure SCells for usage with the target PCell. When adding a new SCell, dedicated RRC signaling is used for sending all required system information of the SCell, i.e. while in connected mode, UEs need not acquire broadcasted system information directly from the SCells.

Dual connectivity is described. Dual connectivity is an operation where a given UE consumes radio resources provided by at least two different network points (master eNB (MeNB) and secondary eNB (SeNB)) connected with non-ideal backhaul while in RRC_CONNECTED. That is, the UE receives two kind of services by the dual connectivity. One of the services is received from the MeNB directly. The MeNB is an eNB which terminates at least S1-MME and therefore act as mobility anchor towards the core network (CN) in dual connectivity. The other service is received from the SeNB. The SeNB is an eNB which provides additional radio resources for the UE, which is not the MeNB, in dual connectivity. Further, the service may be moved between the macro eNB and SeNB depending on the UE's requirement or load status of the eNBs. A master cell group (MCG) refers the group of the serving cells associated with the MeNB, comprising of the PCell and optionally one or more SCells. A secondary cell group (SCG) refers the group of the serving cells associated with the SeNB, comprising of primary SCell (PSCell) and optionally one or more SCells.

Since rel-8, 3GPP has standardized access network discovery and selection functions (ANDSF), which is for interworking between 3GPP access network and non-3GPP access network (e.g. wireless local area network (WLAN)). The ANDSF is elaborated in 3GPP TS 24.312. The ANDSF management object (MO) is used to manage inter-system mobility policy (ISMP) and inter-system routing policy (ISRP) as well as access network discovery information stored in a UE supporting provisioning of such information from an ANDSF. The ANDSF may initiate the provision of information from the ANDSF to the UE. The relation between ISMP, ISRP and discovery information is that ISMP prioritize the access network when the UE is not capable to connect to the EPC through multiple accesses, ISRP indicate how to distribute traffic among available accesses when the UE is capable to connect to the EPC through multiple accesses (i.e. the UE is configured for IP flow mobility (IFOM), multiple access connectivity (MAP-CON), non-seamless WLAN offload or any combination of these capabilities), while discovery information provide further information for the UE to access the access network defined in the ISMP or in the ISRP. The MO defines validity areas, position of the UE and availability of access networks in terms of geographical coordinates. The UE is not required to switch on all UE's supported radios for deducing its location for ANDSF purposes or for evaluating the validity area condition of a policy or discovery information. The UE shall discard any node which is a child of the ANDSF MO root node and is not supported by the UE. The ANDSF server shall discard any node which is a child of the ANDSF MO root node and is not supported by the ANDSF server.

The UE may be provisioned with multiple valid ISMP, ISRP, inter-APN routing policies (IARP) and WLAN selection policies (WLANSP) rules (by the home PLMN (HPLMN) and by the visited PLMN (VPLMN) when it is roaming). The UE does not apply all these valid rules but selects and applies only the "active" rules. Specifically:

A UE that cannot simultaneously route IP traffic over 3GPP access and over WLAN access shall select an active ISMP rule, an active IARP rule and an active WLANSP rule, as specified below.

A UE that can simultaneously route IP traffic over 3GPP access and over WLAN access shall select an active ISRP rule, an active IARP rule and an active WLANSP rule, as specified below.

When the UE is not roaming, it shall select the active ISMP/ISRP rule, the active IARP rule and the active WLANSP rule to apply from the valid rules provided by the HPLMN based on the individual priorities of these rules (or based on other criteria). For example, the highest priority valid WLANSP rule is selected as the active WLANSP rule.

When the UE is roaming, it may have valid rules from both HPLMN and VPLMN. In this case, the UE shall select the active rules as follows:

1) The active IARP rule is selected from the valid IARP rules provided by the HPLMN.

2) The active ISMP/ISRP rule and the active WLANSP rule are selected based on the UE configuration as follows:

a) The UE is configured to "prefer WLAN selection rules provided by the HPLMN" or not. This configuration can be done either by the user or by the home ANDSF (H-ANDSF) via the list of "VPLMNs with preferred WLAN Selection Rules". User configuration takes precedence over the H-ANDSF configuration.

b) If the UE is configured not to prefer WLAN selection rules provided by the HPLMN (i.e. the VPLMN to which the UE is registered is included in the list of "VPLMNs with preferred WLAN Selection Rules"), then the UE shall check the WLANSP rule of the VPLMN and shall determine if there are available WLAN access networks that match one or more groups of selection criteria in this rule.

i) If there is at least one WLAN access network that matches one or more groups of selection criteria in the WLANSP rule of the VPLMN, then the UE shall select the active WLANSP rule and the active ISMP/ISRP rule from the valid rules provided by the VPLMN (based on their priority values).

ii) If there is no WLAN access network that matches one or more groups of selection criteria in the WLANSP rule of the VPLMN, then the UE shall select the active WLANSP rule and the active ISMP/ISRP rule from the valid rules provided by the HPLMN. When the UE determines that at least one WLAN access network that matches one or more groups of selection criteria in the WLANSP rule of the VPLMN becomes available, it shall operate as in bullet i) above and may re-select to such WLAN access network.

c) If the UE is configured to prefer WLAN selection rules provided by the HPLMN (i.e. the VPLMN to which the UE is registered is not included in the list of "VPLMNs with preferred WLAN Selection Rules"), then the UE shall check the WLANSP rule of the HPLMN and shall determine if there are available WLAN access networks that match one or more groups of selection criteria in this rule.

i) If there is at least one WLAN access network that matches one or more groups of selection criteria in the WLANSP rule of the HPLMN, then the UE shall select the active WLANSP rule and the active ISMP/ISRP rule from the valid rules provided by the HPLMN (based on their priority values).

ii) If there is no WLAN access network that matches one or more groups of selection criteria in the WLANSP rule of the HPLMN, then the UE shall select the active WLANSP rule and the active ISMP/ISRP rule from the valid rules provided by the VPLMN. When the UE determines that at least one WLAN access network that matches one or more groups of selection criteria in the WLANSP rule of the HPLMN becomes available, it shall operate as in bullet i) above and may re-select to such WLAN access network.

During power-up, while the UE has not registered to any PLMN, the UE shall consider the WLANSP rules provided by the HPLMN as valid and shall select an active WLANSP rule as described above (the one with the highest priority). Thus during power-up the UE can select a WLAN network based on the WLANSP rules provided by HPLMN.

In addition to ANDSF, additional policy may be specified in RAN specification for interworking between 3GPP access network (e.g. E-UTRAN) and non-3GPP access network (e.g. WLAN). The additional policy for interworking between 3GPP access network and non-3GPP access network may be referred to as RAN rule. Hereinafter, interworking between 3GPP access network (e.g. E-UTRAN) and non-3GPP access network (e.g. WLAN) may be referred to as traffic steering.

For access network selection and traffic steering between 3GPP and WLAN, RAN assistance parameters may be provided to the UE in system information or in the RRC connection reconfiguration message. If any of RAN assistance parameters are provided in dedicated signaling, i.e. via the RRC connection reconfiguration message, the UE may ignore all RAN assistance parameters provided in system information. RAN assistance parameters received via system information may valid only if the UE is camped on a suitable cell. The UE may discard the RAN assistance parameters upon cell reselection or handover. The UE may keep and apply RAN assistance parameters provided in dedicated signaling in RRC_IDLE, until a validity time of RAN assistance parameters, since the UE entered RRC_IDLE, has expired.

Access network selection and traffic steering rules may be only applicable for a WLAN for which an identifier has been signaled to the UE by the network if the UE is capable of traffic steering between 3GPP and WLAN, and if the UE is not provisioned with active ANDSF policies. The AS layer may indicate to the upper layers when and for which WLAN identifiers the following conditions 1 and 2 for steering traffic from 3GPP to WLAN are satisfied for a time interval TsteeringwLAN. TsteeringwLAN specifies the timer value during which the rules should be fulfilled before starting traffic steering between 3GPP and WLAN. WLAN identifiers may be provided service set IDs (SSIDs), basic service set IDs (BSSIDs) or homogeneous extended service set IDs (HESSIDs) which shall be considered in the WLAN/3GPP radio interworking mechanism.

1. In the E-UTRAN serving cell:
Qrxlevmeas<$Thresh_{ServingOffloadWLAN, LowP}$; or
Qqualmeas<$Thresh_{ServingOffloadWLAN, LowQ}$;
2. In the target WLAN:
ChannelUtilizationWLAN<$Thresh_{ChUtilWLAN, Low}$; and
BackhaulRateDlWLAN>$Thresh_{BackhRateDLWLAN, High}$; and
BackhaulRateUlWLAN>$Thresh_{BackhRateULWLAN, High}$;

In the above conditions, Qrxlevmeas is measured cell RX level value (reference signal received power (RSRP)). Qqualmeas is measured cell quality value (reference signal received quality (RSRQ)). ChannelUtilizationWLAN is WLAN channel utilization value from BSS Load information element (IE) obtained from 802.11 (beacon or probe response) signaling for indicated WLAN identifier. BackhaulRateDlWLAN is WLAN backhaul available DL bandwidth. BackhaulRateUlWLAN is WLAN backhaul available UL bandwidth. $Thresh_{ServingOffloadWLAN, LowP}$ specifies the RSRP threshold (in dBm) used by the UE for traffic steering to WLAN. $Thresh_{ServingOffloadWLAN, LowQ}$ specifies the RSRQ threshold (in dB) used by the UE for traffic steering to WLAN. $Thresh_{ChUtilWLAN, Low}$ specifies the WLAN channel utilization (BSS load) threshold used by the UE for traffic steering to WLAN. $Thresh_{BackhRateDLWLAN, High}$ specifies the backhaul available downlink bandwidth threshold used by the UE for traffic steering to WLAN. $Thresh_{BackhRateULWLAN, High}$ specifies the backhaul available uplink bandwidth threshold used by the UE for traffic steering to WLAN. The above parameters for access network selection and traffic steering between 3GPP and WLAN may be broadcast in system information and are read from the E-UTRAN serving cell.

The UE shall exclude the evaluation of a measurement for which a threshold has not been provided. If more than one WLAN provided by 3GPP meets the conditions above, then it may be up to UE implementation to choose one of these WLANs.

The AS layer may indicate to the upper layers when the following conditions 1 or 2 for steering traffic from WLAN to 3GPP are satisfied for a time interval TsteeringwLAN.

1. In the selected source WLAN:
ChannelUtilizationWLAN>$Thresh_{ChUtilWLAN, High}$; or
BackhaulRateDlWLAN<$Thresh_{BackhRateDLWLAN, Low}$; or
BackhaulRateUlWLAN<$Thresh_{BackhRateULWLAN, Low}$;
2. In the target E-UTRAN cell:
Qrxlevmeas>$Thresh_{ServingOffloadWLAN, HighP}$; and
Qqualmeas>$Thresh_{ServingOffloadWLAN, HighQ}$;

In the above conditions, $Thresh_{ChUtilWLAN, High}$ specifies the WLAN channel utilization (BSS load) threshold used by the UE for traffic steering to E-UTRAN. $Thresh_{BackhRateDLWLAN, Low}$ specifies the backhaul available downlink bandwidth threshold used by the UE for traffic steering to E-UTRAN. $Thresh_{BackhRateULWLAN, Low}$ specifies the backhaul available uplink bandwidth threshold used by the UE for traffic steering to E-UTRAN. $Thresh_{ServingOffloadWLAN, HighP}$ specifies the RSRP threshold (in dBm) used by the UE for traffic steering to E-UTRAN. $Thresh_{ServingOffloadWLAN, HighQ}$ specifies the RSRQ threshold (in dB) used by the UE for traffic steering to E-UTRAN. The above parameters for access network selection and traffic steering between E-UTRAN and WLAN may be broadcast in system information and are read from the serving E-UTRAN cell.

The UE may exclude the evaluation of a measurement for which a threshold has not been provided. Upper layers may ignore the indication provided by the AS layer if it contradicts user preferences or if the UE is provisioned with ANDSF policies.

When CA or DC is not configured, the UE compares the radio condition of the serving cell of 3GPP with the threshold for traffic steering to/from WLAN. That is, in case of non-CA capable UE and non-DC capable UE, the UE has only one serving cell so that it is clear of which serving cell the UE should compare the radio condition with the threshold and from/to which serving cell traffic steering is performed.

However, when CA or DC is configured, the UE may have multiple serving cells. When CA is configured, a CA capable UE may have one PCell and at least one SCell. When DC is configured, a DC capable UE may have serving cells in MeNB and serving cells in SeNB. In this case, it is unclear from/to which serving cell the UE should steer the traffic to/from the WLAN, and/or of which serving cell the radio condition is compared with threshold.

In order to solve the problem described above, a method for performing traffic steering according to an embodiment of the present invention is described below. Hereinafter, it is assumed that a UE in RRC_CONNECTED is configured with one or more serving cells other than PCell of MeNB (e.g. SCells of MeNB, PSCell of SeNB, SCells of SeNB). In the description below, unless explicitly stated, the PCell means the PCell of the MeNB. The PSCell means the PCell of the SeNB. It is further assumed that the embodiment of the present invention described below may be applied to any interworking polices or rules using the RAN assistance information. The interworking policy/rule may include ANDSF and RAN rule (access network selection and traffic steering rule defined in 3GPP TS36.304). It is further assumed that WLAN related condition for traffic steering to WLAN is fulfilled unless stated.

First, a method for determining a serving cell from which traffic is steered to WLAN or to which traffic is steered from WLAN according to an embodiment of the present invention is described. According to an embodiment of the present invention, there may be two solutions, one of which is network based solution, and the other is UE based solution.

Figure 6:
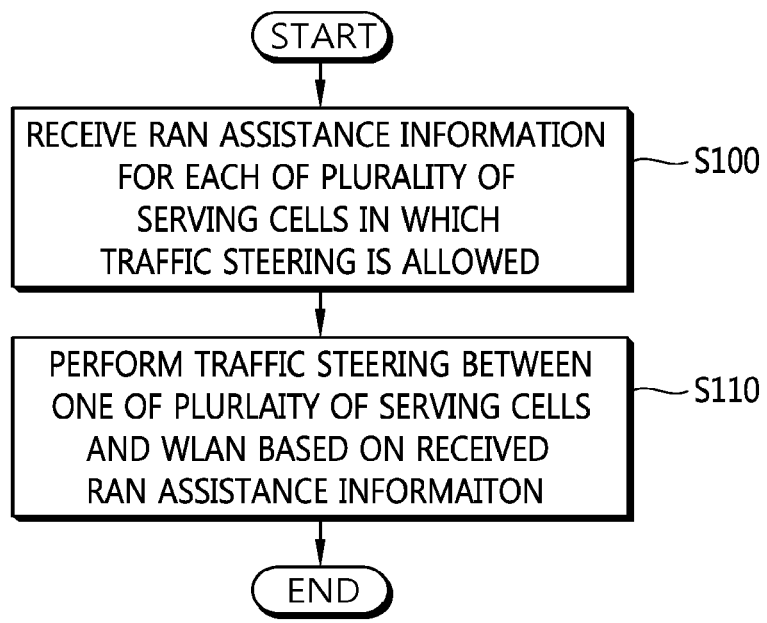
FIG. 6 shows an example of a method for performing traffic steering according to an embodiment of the present invention.

FIG. 6 shows an example of a method for performing traffic steering according to an embodiment of the present invention. This example corresponds to the network based solution. In the network based solution, the network indicates from which serving cell the UE should steer traffic to WLAN, and/or to which serving cell should steer traffic from WLAN. The network indicates whether the traffic steering is allowed or not for each serving cell.

In step S100, the UE receives in PCell RAN assistance information for each of the plurality of serving cells in which traffic steering is allowed from the eNB. The eNB may provide to the UE the separate RAN assistance information including each cell identifier for each allowed serving cell via dedicated/broadcast signaling. Alternatively, the eNB may provide to the UE one common RAN assistance information including all cell identifiers for all allowed serving cells. Alternatively, the eNB may provide to the UE sets of RAN assistance information and linkage between each set of RAN assistance information and the corresponding cells identifiers.

The RAN assistance information may include at least one of followings:
- WLAN related threshold: channel utilization threshold, UL/DL backhaul threshold, signal level threshold.
- 3GPP related threshold: RSRP, RSRQ threshold, channel utilization (congestion level) threshold, backhaul threshold.
- WLAN identifiers: SSID, BSSID, HESSID.

Further, the RAN assistance information may be provided via broadcast and/or dedicated signaling in each allowed serving cell. Alternatively, the RAN assistance information may be provided via broadcast and/or dedicated signaling in PCell and/or in PSCell. The assistance information provided in PCell and PSCell may be applied to one or more serving cells belonging to the MeNB and SeNB, respectively. If the RAN assistance information is provided via dedicated signaling by one or more serving cells, the UE may not apply the RAN assistance information provided via broadcast signaling by any serving cells.

Upon receiving the RAN assistance information from the eNB, for traffic steering to WLAN or vice versa, the UE compares the conditions of each allowed serving cell with thresholds for each allowed serving cell. If the conditions for traffic steering are met, in step S110, the UE performs traffic steering between one of the plurality of serving cells and WLAN based on the received RAN assistance information. If the conditions for traffic steering to WLAN are met, the UE may steer traffic of the serving cell, which is allowed to steer traffic, to the WLAN. If the conditions for traffic steering to 3GPP are met, the UE may steer traffic of WLAN to the serving cell from which the traffic have been steered.

If the offloadable traffic (one PDN/bearer/APN/IP flow) is served by more than one serving cells, the UE may steer traffic from all serving cells to WLAN if condition of one of serving cells is met or all the serving cell condition is met.

For steering to 3GPP serving cell, the traffic of WLAN may be steered to PCell if condition of PCell is met. Alternatively, the traffic of WLAN may be steered to PCell and/or PSCell from which the traffic was steered if condition of PCell and/or PSCell is met. Alternatively, the traffic of WLAN may be steered to each serving cell from which the traffic was steered if condition of each serving cell is met. If the serving cell is deactivated or de-configured, the traffic may be steered to PCell.

Further, the UE may indicate various pieces of information to the network after determining to steer traffic before actually steering traffic to WLAN. The indication may include at least one of bearer identity/evolved packet system (EPS) bearer identity/PDN identity/APN/IP flow to be steered, cell identity of the cell which the RAN rule/comparison is satisfied, WLAN identifier which the RAN rule is satisfied, signal level of 3GPP/WLAN, channel utilization of the WLAN, or available backhaul data rate of the WLAN.

Further, offloadable/non-offloadable APN/PDN identity/EPS bearer identity/IP flow may be used for traffic routing information per UE.

Figure 7:
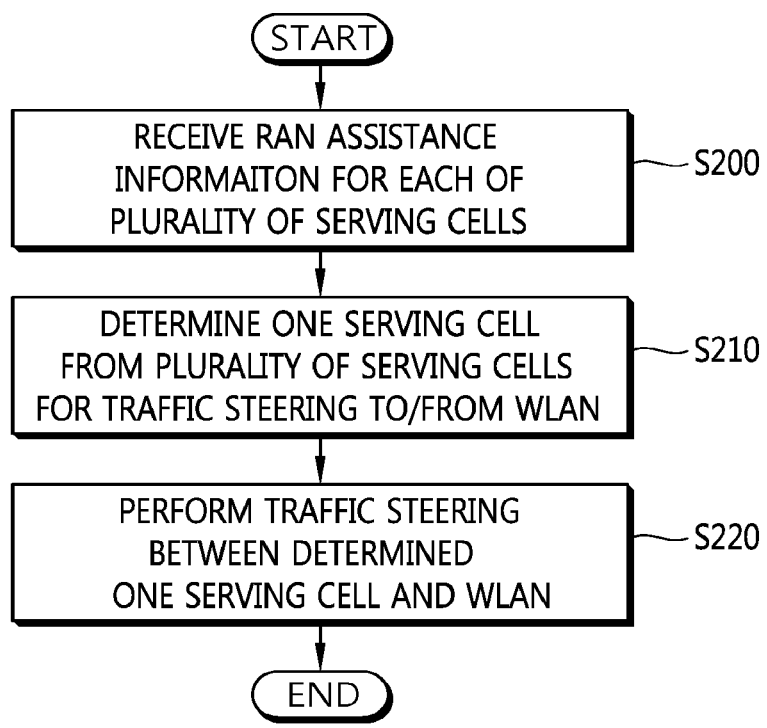
FIG. 7 shows another example of a method for performing traffic steering according to an embodiment of the present invention.

FIG. 7 shows another example of a method for performing traffic steering according to an embodiment of the present invention. This example corresponds to the UE based solution. In the UE based solution, the UE autonomously determines the serving cell from which the UE steers traffic to WLAN and/or to which serving cell should steer traffic from WLAN.

In step S200, the UE receives RAN assistance information for each of the plurality of serving cells. The signaling mechanism for providing the RAN assistance information used for the network based solution described above may be also applied to the UE based solution.

In step S210, the UE determines a subset of serving cells, from the plurality of serving cells, for traffic steering to/from WLAN. That is, the UE determines the serving cell from which the UE steers traffic to WLAN and to which the UE steers traffic from WLAN. The UE may determine the serving cell from/to which the UE steers traffic based on at least one of 3GPP serving cell load, 3GPP serving cell backhaul load, or 3GPP serving cell signal level. For the remaining cells except the selected cell, the UE may not perform traffic steering even if the conditions of the cell and the target WLAN is fulfilled.

If the conditions for traffic steering are met, in step S220, the UE performs traffic steering between the determined one serving cell and WLAN. If the conditions for traffic steering to WLAN are met, the UE steers traffic of the serving cell, which the UE determines to steer traffic, to the WLAN. The UE steers traffic of WLAN to a serving cell from which the traffic has been steered if condition of the serving cell is met. Alternatively, the traffic of WLAN may be steered to PCell if condition of PCell is met. Alternatively, the traffic of WLAN may be steered to PCell and/or PSCell from which the traffic was steered if condition of PCell and/or PSCell is met. If the serving cell is deactivated or de-configured, the traffic may be steered to PCell.

The UE may indicate to the network after steering traffic to WLAN. Alternatively, the UE may indicate to the network after determining to steer traffic before actually steering traffic to WLAN. The indication may include at least one of bearer identity/EPS bearer identity/PDN identity/APN/IP flow, cell identity, or WLAN identifier.

Further, offloadable/non-offloadable APN/PDN identity/EPS bearer identity/IP flow may be used for traffic routing information per UE.

Figure 8:
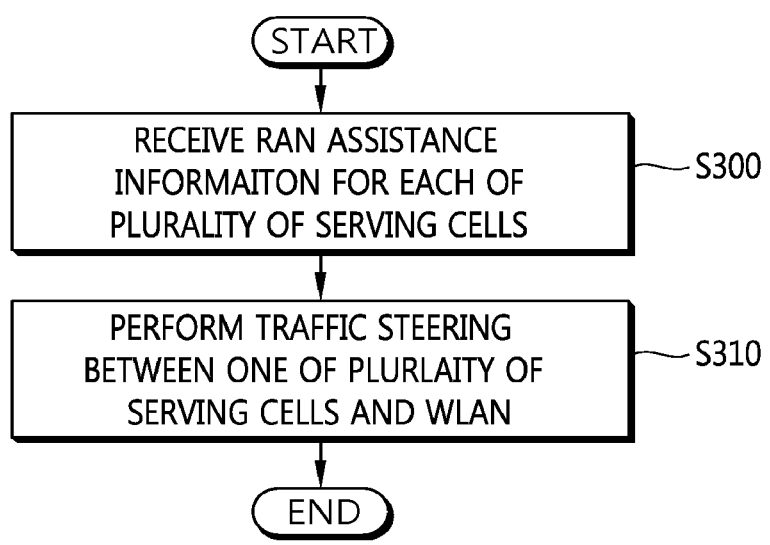
FIG. 8 shows another example of a method for performing traffic steering according to an embodiment of the present invention.

FIG. 8 shows another example of a method for performing traffic steering according to an embodiment of the present invention. In step S300, the UE receives RAN assistance information for each of the plurality of serving cells. In step S310, the UE performs traffic steering between one serving cell, among the plurality of serving cells, and WLAN. The plurality of serving cells may include the PCell and at least one SCell by carrier aggregation. The plurality of serving cells may include PCell/SCell(s) of the MeNB and PSCell/SCell(s) of the SeNB by dual connectivity. The RAN assistance information may be received via broadcast signaling or dedicated signaling.

For network based solution described above, the plurality of serving cells may be serving cells in which traffic steering is allowed. The RAN assistance information may include cell identifiers for each of the plurality of serving cells. Upon receiving the RAN assistance information, for traffic steering to WLAN or vice versa, the UE compares the conditions of each allowed serving cell with corresponding thresholds indicated in the corresponding RAN assistance information. If the conditions for traffic steering to WLAN are met, the UE may steer traffic of the serving cell, which is allowed to steer traffic, to the WLAN. If the conditions for traffic steering to 3GPP are met, the UE may steer traffic of WLAN to the serving cell from which the traffic have been steered.

For UE based solution, the UE may autonomously determine the one or more serving cells from which traffic is steered to the WLAN and to which traffic is steered from the WLAN. The one serving cell may be determined based on at least one of loads of serving cells, backhaul loads of serving cells, or signal levels of serving cells. If the conditions for traffic steering to WLAN are met, the UE steers traffic of the serving cell, which the UE determines to steer traffic, to the WLAN. If the conditions for traffic steering to 3GPP is met, the UE steers traffic of WLAN to the serving cell from which the traffic have been steered.

Second, a method for handling RAN assistance information for UE in RRC_CONNECTED for traffic steering according to an embodiment of the present invention is described. It is assumed that the UE is configured with CA and/or DC so that the UE has more than one serving cells. Hereinafter, the wording 'utilize the RAN assistance information provided in cell A' means that the UE receives the RAN assistance information provided from cell A and compares the measured results of cell A with the RAN assistance information provided from cell A.

(1) Comparison with Each Serving Cell

The network provides the RAN assistance information via broadcast/dedicated signaling in more than two serving cells among PCell, PSCell and SCells (of the MeNB and SeNB). The UE utilizes the RAN assistance information provided in PCell and SCell of MeNB and SeNB, respectively. That is, the UE compares the measured results of PCell, PSCell and SCells of the MeNB and SeNB with the RAN assistance information for PCell, PSCell and SCells of the MeNB and SeNB, respectively. For example, the measured results of PCell is compared with the RAN assistance information provided for PCell, while the measured results of SCell is compared with the RAN assistance information provided for SCell. For example, the measured results of PSCell is compared with the RAN assistance information provided for PSCell. This method may be applied to the traffic steering from 3GPP to WLAN and vice versa. Additionally, when PSCell and/or SCell of MeNB/SeNB are de-configured or de-activated, the UE may utilize the RAN assistance information provided for PCell. Additionally, in case of DC, when SCell of the SeNB is de-configured or de-activated while PSCell is configured and activated, the UE may utilize the RAN assistance information provided for PSCell.

(2) Comparison with PCell of MeNB

The network provides the RAN assistance information via broadcast/dedicated signaling in PCell. The network may provide the RAN assistance information via broadcast signaling in other one or more serving cells among PSCell and SCells. But, the UE only utilizes the RAN assistance information provided in PCell and compares the measured results of PCell with the RAN assistance information provided in PCell. In other words, the UE ignores the RAN assistance information provided in PSCell as well as SCells of the MeNB and SeNB. This method may be applied to the traffic steering from 3GPP to WLAN and vice versa.

Figure 9:
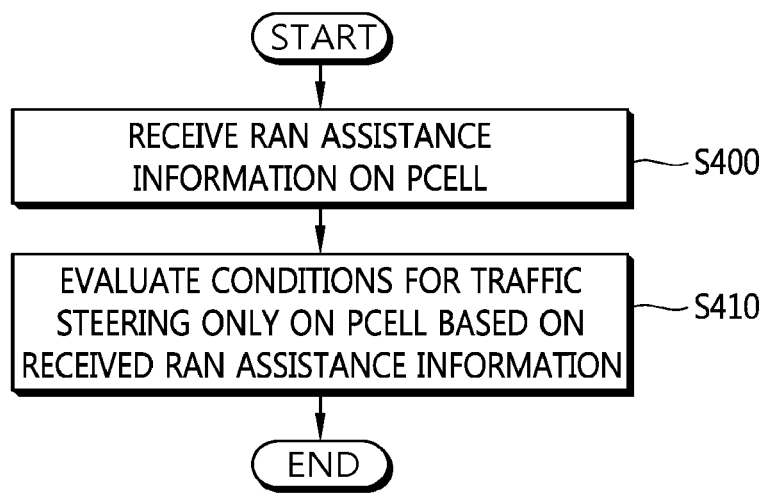
FIG. 9 shows an example of a method for evaluating conditions for traffic steering according to an embodiment of the present invention.

FIG. 9 shows an example of a method for evaluating conditions for traffic steering according to an embodiment of the present invention.

In step S400, the UE receives RAN assistance information on the PCell. The RAN assistance information may be received via broadcast signaling or dedicated signaling.

In step S410, the UE evaluates 3GPP related conditions for traffic steering only on the PCell based on the received RAN assistance information. The UE may be configured with the PCell and at least one SCell by carrier aggregation. Or, the UE may be configured with the PCell, PSCell, and SCells of the MeNB and/or SeNB by dual connectivity.

When the 3GPP related conditions for traffic steering are met on the PCell, the UE may perform traffic steering between serving cell(s) and the WLAN if there is offloadable traffic in serving cell(s). The serving cell may be the PCell, or the other serving cell than the PCell. That is, traffic of serving cells other than the PCell (of MeNB) may be steered based on the condition of the PCell and RAN assistance information received only on the PCell.

(3) Comparison with PCell and PSCell

The network provides the RAN assistance information via broadcast/dedicated signaling in PCell and PSCell. The network may provide the RAN assistance information via broadcast signaling in SCells of the MeNB and/or SeNB. But, the UE only utilizes the RAN assistance information provided in PCell and PSCell compares the measured results of PCell and PSCell with the RAN assistance information provided in PCell and PSCell, respectively. If the 3GPP related conditions for traffic steering are met on PCell, the UE performs traffic steering between serving cell(s) of the MeNB and WLAN if there is offloadable traffic in serving cell(s) of the MeNB. If the 3GPP related conditions for traffic steering are met on PSCell, the UE performs traffic steering between serving cell(s) of the SeNB and WLAN if there is offloadable traffic in serving cell(s) of the SeNB. For the split bearer which is offloadable, if the 3GPP related conditions for traffic steering are met on (either PCell or PSCell) or (both PCell and PSCell), the UE performs traffic steering between serving cell(s) of the MeNB and WLAN if there is offloadable traffic in serving cell(s) of the MeNB. The UE ignores the RAN assistance information provided in SCell of the MeNB and SeNB. This method may be applied to the traffic steering from 3GPP to WLAN and vice versa. Additionally, when PSCell is de-configured or de-activated, the UE may utilize the RAN assistance information provided from PCell for steering from WLAN to 3GPP.

(4) Comparison with PCell (of MeNB) for Steering from WLAN

For traffic steering from 3GPP to WLAN, one of options among (1), (2) and (3) described above may be used.

For traffic steering from WLAN to 3GPP, the UE only utilizes the RAN assistance information provided in PCell and compares the measured results of PCell with the RAN assistance information provided in PCell. If the 3GPP related conditions are met on PCell, the UE steers traffic of WLAN to PCell. The UE ignores the RAN assistance information provided in PSCell as well as SCells of the MeNB and SeNB.

(5) Comparison with PCell and/or PSCell for Steering from WLAN

For traffic steering from 3GPP to WLAN, one of options among (1), (2) and (3) described above may be used.

For traffic steering from WLAN to 3GPP, the UE only utilizes the RAN assistance information provided in PCell and PSCell, respectively. In other words, the UE ignores the RAN assistance information provided in SCells of the MeNB and SeNB. For traffic steering from WLAN to the MeNB, the UE only utilizes the RAN assistance information provided in PCell of the MeNB, while for steering from WLAN to the SeNB, the UE only utilizes the RAN assistance information provided in PSCell. If the 3GPP related conditions are met on PCell, the UE steers traffic of WLAN to PCell of the MeNB. If the 3GPP related conditions are met on PSCell, the UE steers traffic of WLAN to PSCell of the SeNB. The UE autonomously determines the serving cell to compare. Alternatively, the UE stores the traffic information about from which serving cell the traffic is steered. And the UE compares PCell of the MeNB and/or PSCell of the SeNB to which traffic belongs. Additionally, when PSCell is de-configured or de-activated, the UE may utilize the RAN assistance information provided from PCell.

(6) Network Indication

The network provides the RAN assistance information via broadcast/dedicated signaling in PCell, PSCell, and SCells (of MeNB and SeNB). Further, the network indicates whether the traffic steering in each serving cell is allowed, when the network configures the cell (PSCell and/or SCell of MeNB and SeNB) for the UE. Even if there is offloadable traffic in a serving cell, the UE does not steer traffic from the serving cell to WLAN if the traffic steering in the serving cell is not allowed. If traffic steering is allowed, the network may also indicate from which serving cell the UE should receive the RAN assistance information and with which serving cell the UE should compare the threshold.

Figure 10:
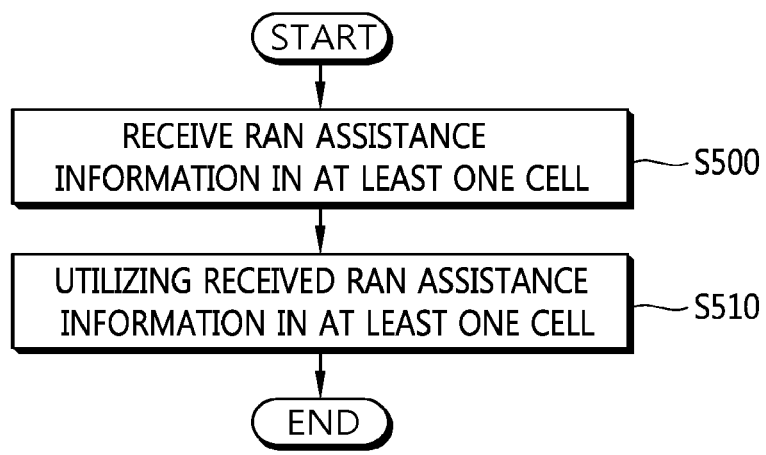
FIG. 10 shows an example of a method for handling RAN assistance information according to an embodiment of the present invention.

FIG. 10 shows an example of a method for handling RAN assistance information according to an embodiment of the present invention. In step S500, the UE receives RAN assistance information in at least one cell. In step S510, the UE utilizes the received RAN assistance in at least one cell. Various methods described above may be applied to handle the RAN assistance information when CA or DC is configured.

Figure 11:
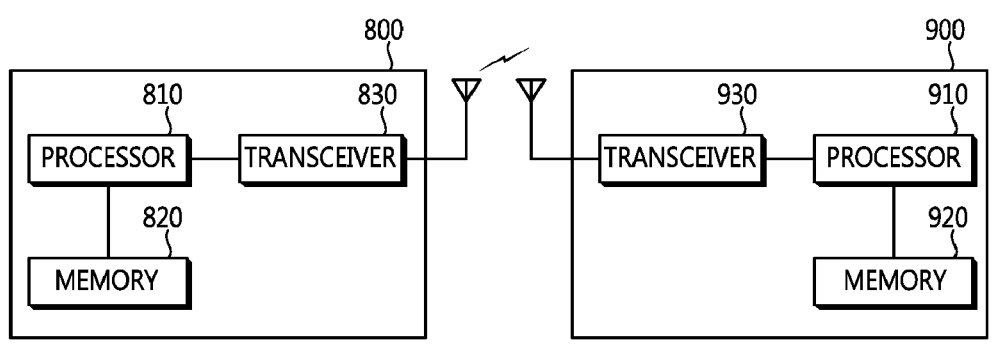
FIG. 11 shows a wireless communication system to implement an embodiment of the present invention.

FIG. 11 shows a wireless communication system to implement an embodiment of the present invention.

An eNB 800 may include a processor 810, a memory 820 and a transceiver 830. The processor 810 may be configured to implement proposed functions, procedures and/or methods described in this description. Layers of the radio interface protocol may be implemented in the processor 810. The memory 820 is operatively coupled with the processor 810 and stores a variety of information to operate the processor 810. The transceiver 830 is operatively coupled with the processor 810, and transmits and/or receives a radio signal.

A UE 900 may include a processor 910, a memory 920 and a transceiver 930. The processor 910 may be configured to implement proposed functions, procedures and/or methods described in this description. Layers of the radio interface protocol may be implemented in the processor 910. The memory 920 is operatively coupled with the processor 910 and stores a variety of information to operate the processor 910. The transceiver 930 is operatively coupled with the processor 910, and transmits and/or receives a radio signal.

The processors 810, 910 may include application-specific integrated circuit (ASIC), other chipset, logic circuit and/or data processing device. The memories 820, 920 may include read-only memory (ROM), random access memory (RAM), flash memory, memory card, storage medium and/or other storage device. The transceivers 830, 930 may include baseband circuitry to process radio frequency signals. When the embodiments are implemented in software, the techniques described herein can be implemented with modules (e.g., procedures, functions, and so on) that perform the functions described herein. The modules can be stored in memories 820, 920 and executed by processors 810, 910. The memories 820, 920 can be implemented within the processors 810, 910 or external to the processors 810, 910 in which case those can be communicatively coupled to the processors 810, 910 via various means as is known in the art.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope and spirit of the present disclosure.

What is claimed is:

1. A method performed by a wireless device user equipment (UE) in a wireless communication system, the method comprising:
   receiving radio access network (RAN) assistance information from a first network system;
   evaluating conditions for a traffic steering between the first network system and a second network system by comparing the RAN assistance information only with a quality of a primary cell (PCell) among serving cells of the first network system; and
   performing the traffic steering from the first network system to the second network system based on that conditions for the traffic steering are met on the PCell,
   wherein the RAN assistance information comprises a threshold value used by the wireless device for the traffic steering to the second network system,
   wherein the comparing of the RAN assistance information comprises comparing the threshold value only with the quality of the PCell among the serving cells of the first network system, and
   wherein the conditions for the traffic steering are met on the PCell based on that the quality of the PCell is less than the threshold value.

2. The method of claim 1, wherein the first network system comprises a $3^{rd}$ generation partnership project (3GPP) access network.

3. The method of claim 1, wherein the second network system comprises a wireless local area network (WLAN).

4. The method of claim 1, wherein the serving cells include at least one secondary cell (SCell) configured by a carrier aggregation.

5. The method of claim 1, wherein the PCell on which the conditions for the traffic steering are evaluated is a PCell of a master evolved NodeB (MeNB) and the serving cells include at least one cell of a secondary eNB (SeNB) configured by dual connectivity.

6. The method of claim 1, wherein the RAN assistance information is received via broadcast signaling or dedicated signaling.

7. The method of claim 1, wherein the second network system comprises a wireless local area network (WLAN) for which a WLAN ID has been provided from the first network system to the wireless device the UE.

8. The method of claim 7, wherein the WLAN ID comprises at least one of a service set ID (SSID), a basic service set ID (BSSID), or a homogeneous extended service set ID (HESSID).

9. The method of claim 1, wherein the serving cells for which the traffic steering is performed include the PCell.

10. The method of claim 1, wherein the serving cells for which the traffic steering is performed include a serving cell other than the PCell.

11. A wireless device in a wireless communication system, the wireless device comprising:
   a memory;
   a transceiver; and at least one processor, operably coupled to the memory and the transceiver, configured to:

control the transceiver to receive radio access network (RAN) assistance information from a first network system, evaluate conditions for a traffic steering between the first network system and a second network system by comparing the RAN assistance information only with a quality of a primary cell (PCell) among serving cells of the first network system, and perform the traffic steering from the first network system to the second network system based on that conditions for the traffic steering are met on the PCell, wherein the RAN assistance information comprises a threshold value used by the wireless device for the traffic steering to the second network system, wherein the at least one processor is further configured to compare the threshold value only with the quality of the PCell among the serving cells of the first network system, and wherein the conditions for the traffic steering are met on the PCell based on that the quality of the PCell is less than the threshold value.

12. The wireless device of claim 11, wherein the first network system comprises a $3^{rd}$ generation partnership project (3GPP) access network, and wherein the second network system comprises a wireless local area network (WLAN).

13. A processor for a wireless device in a wireless communication system, wherein the processor is configured to control the wireless device to:

receive radio access network (RAN) assistance information from a first network system, evaluate conditions for a traffic steering between the first network system and a second network system by comparing the RAN assistance information only with a quality of a primary cell (PCell) among serving cells of the first network system, and perform the traffic steering from the first network system to the second network system based on that conditions for the traffic steering are met on the PCell, wherein the RAN assistance information comprises a threshold value used by the wireless device for the traffic steering to the second network system, wherein the processor is further configured to control the wireless device to compare the threshold value only with the quality of the PCell among the serving cells of the first network system, and wherein the conditions for the traffic steering are met on the PCell based on that the quality of the PCell is less than the threshold value.

* * * * *